United States Patent [19]

Modrak

[11] Patent Number: 5,470,640
[45] Date of Patent: Nov. 28, 1995

[54] HIGH LOFT AND HIGH STRENGTH NONWOVEN FABRIC

[75] Inventor: James P. Modrak, Conyers, Ga.

[73] Assignee: Hercules Incorporated, Wilmington, Del.

[21] Appl. No.: 156,747

[22] Filed: Nov. 24, 1993

Related U.S. Application Data

[62] Division of Ser. No. 938,574, Aug. 31, 1992, Pat. No. 5,288,348, which is a continuation of Ser. No. 628,061, Dec. 14, 1990, abandoned.

[51] Int. Cl.⁶ .................... B32B 5/24; B32B 7/04
[52] U.S. Cl. .............. 428/171; 428/172; 428/198; 428/218; 428/286; 428/296; 428/302; 604/366; 604/380
[58] Field of Search .................. 428/198, 171, 428/172, 218, 286, 296, 302; 604/366, 380; 156/62.2, 209, 290, 324

[56] References Cited

U.S. PATENT DOCUMENTS

| | | | |
|---|---|---|---|
| 2,964,441 | 12/1960 | Goldstone | 156/209 |
| 3,485,705 | 12/1969 | Harmon | 156/291 |
| 3,530,023 | 9/1970 | Schutte et al. | 156/290 |
| 3,639,199 | 2/1972 | Brandts et al. | 156/291 |
| 3,812,553 | 5/1974 | Marshall et al. | 19/302 |
| 4,041,203 | 8/1977 | Brock et al. . | |
| 4,041,951 | 8/1977 | Sanford | 128/287 |
| 4,159,360 | 6/1979 | Kim | 428/195 |
| 4,223,677 | 9/1980 | Anderson . | |
| 4,355,066 | 10/1982 | Newman | 428/198 |
| 4,391,869 | 7/1983 | Cook et al. | 428/218 |
| 4,548,856 | 10/1985 | Khan et al. | 428/171 |
| 4,652,484 | 3/1987 | Shiba et al. | 428/286 |
| 4,659,614 | 4/1987 | Vitale | 428/218 |
| 4,725,473 | 2/1988 | Van Gompel et al. | 156/290 |
| 4,761,322 | 8/1988 | Raley | 428/198 |
| 4,863,785 | 9/1989 | Berman et al. | 428/218 |
| 4,883,707 | 11/1989 | Newkirk | 428/219 |

FOREIGN PATENT DOCUMENTS

| | | | |
|---|---|---|---|
| 914891 | 11/1972 | Canada . | |
| 171807 | 2/1986 | European Pat. Off. | D04H 1/54 |
| 2746146 | 4/1978 | Germany | D04H 1/52 |
| 3037032 | 5/1982 | Germany | 156/290 |
| 2127865 | 4/1984 | United Kingdom | D04H 1/54 |

OTHER PUBLICATIONS

Smith James E. "Multilayer Diaper Coverstocks Offer New Opportunities," Nonwovens World, Jul. 1988, pp. 26–31.
Pirkkanen, J., "Multilayer Nonwovens for Coverstock, Medical and Other End Uses," Nonwovens World, Nov. 1987, pp. 57–57.

*Primary Examiner*—James C. Cannon
*Attorney, Agent, or Firm*—Mark D. Kuller; John E. Crowe

[57] ABSTRACT

High loft durable nonwoven material comprising facing and base components and corresponding process for preparation thereof and process for obtaining by (a) forming and compiling a facing component comprising one or more facing web(s) of staple fiber and/or fibrillated film;

(b) lightly bonding the formed and compiled facing webs, utilizing a low density bonding pattern having a small bonding area relative to the corresponding surface area of said facing component;

(c) laying a web comprising staple fiber and/or fibrillated film onto the lightly bonded facing component under conditions favoring arrangement in general cross or transverse direction relative to machine direction of the facing component; and (d) bonding said cross or transversely laid web to form a base component to said facing component, utilizing a substantially greater bonding density then employed for said facing component, to obtain the desired nonwoven material.

43 Claims, 4 Drawing Sheets

HIGH LOFT AND HIGH STRENGTH NONWOVEN FABRIC

This application is a division, of application Ser. No. 07/938,574, filed Aug. 31, 1992, now U.S. Pat. No. 5/288, 348 which is a continuation of application Ser. No. 07/628, 061, filed Dec. 14, 1990, abandoned.

This invention relates to a durable high loft multilayer nonwoven material characterized by both softness and retention of strength and durability commensurate with art-recognized needs for coverstock in the areas defined by disposable diapers, sanitary napkins, incontinence pads and the like, and a method for obtaining the same.

BACKGROUND OF THE INVENTION

It has long been recognized that success in the market place, particularly with respect to disposable diapers incontinence garments or pads and the like, depends substantially on the functional efficiency, appearance, and price of the products being sold.

In general, such products must have a fluid-absorbent core, usually comprising one or more layers of absorbent material such as wood pulp, rayon, gauze, tissue or the like, and, in some cases, synthetic hydrophilic material such as a polyurethane foam.

To protect clothing, and surrounding areas from being stained or wetted by fluids retained in such pad or core, it is also generally backed by a fluid-impervious barrier sheet.

Such fluid-absorbent pad or core generally also has a facing of coverstock material, which covers at least the body-contacting surface of the product.

The fluid-absorbing product is generally packaged in the form of a loosely bonded pad which may have a rectangular or somewhat oval shape.

The functional purpose of such coverstock is two-fold, namely (1) to promote durability by helping to contain the loosely packed pad or core of absorbent material and (2) to insulate the wearer from continuous direct contact with moisture already retained in the absorbent pad or core. Such facing or coverstock must be pervious to fluids on the side of the product that is placed against the body, so as to promote the direct and immediate transfer of each fluid application or insult into the absorbent core; the coverstock itself must also be essentially nonabsorbent to fluid and remain dry. It is particularly important, in this regard, to minimize potential lateral migration of fluid along the coverstock surface, even after repeated insults, and for the coverstock to continue to feel dry, smooth and soft to the touch.

Certain additional characteristics are also sometimes desired, such as visual opacity, specific coloring or luster on the outer surface, and fabric acceptance of external designs.

It is now recognized that the comfort factor (i.e. dryness, softness, resistance to rewet etc.) of diapers, pads, and the like can be substantially improved by increasing thickness or caliper of the nonwoven coversheet, to obtain increased softness while retaining a well-defined separation between the wearer's skin and the fluid-retaining core.

Such increased caliper can be conveniently obtained by increasing the basis weight of the coverstock or by decreasing its density (i.e. increase loft). Of the two, the later is generally favored, but at a sacrifice in durability and strength.

A number of approaches have been offered in the art for obtaining bulkier coverstock. For example, U.S. Pat. No. 4,041,951 teaches embossing a nonwoven topsheet and U.S. Pat. No. 4,391,869 proposes limiting the amount of aqueous binder applied in a vacuum-bonding operation with airlaid nonwovens. More recently, thru-air-bonded bicomponent fiber structures have been considered. Added detail concerning general use of thru-air bonding techniques is found in an article entitled "Multi-layer Nonwovens for Coverstock, Medical, and other End Uses" by J. Pirkkanen in the November 1987 issue of "Nonwovens World".

This reference utilizes multilayer nonwoven fabrics having a basis weight of about 30 grams per square meter.

U.S. Pat. No. 4,548,856 and U.K. patent application GB 2,127,865A are also of interest in disclosing thru-air bonding procedures involving multibelt systems which form patterned nonwoven fabric.

Also of interest is U.S. Pat. No. 4,652,484 (assigned to Kao) which proposes forming a diaper liner having a layered structure, in which the first layer is comprised of 1–3 denier straight bicomponent fiber and the second layer of sterically-buckled (three-dimensional crimp) 1.5 to 6 denier bicomponent fiber. This patent proposes achieving optimum thickness and softness through use of sterically-buckled bicomponent fiber.

Some degree of improvement in mechanical strength is obtained in U.S. Pat. No. 4,761,322, (Kimberly-Clark Corporation), through use of a top web layer of nonwoven laminate, which is densely calender bonded to a bottom web layer of substantially lower bonding density.

To date, however, the art has not been able to provide nonwovens with the desired high loft while retaining flow through and sufficient dimensional stability and durability to meet market needs.

It is an object of the present invention to obtain a high loft soft nonwoven material suitable as a diaper coverstock or the like without sacrificing durability, or strength, and while retaining required flow-through and fewer properties.

THE INVENTION

The above object, particularly the production of durable high loft nonwoven material having acceptable liquid-flow through properties is achieved by (a) forming and compiling at least one web of staple fiber of thermoplastic material, inclusive of polyolefins, polyesters, polyamides and the like as monocomponent or bicomponent fiber, or mixtures thereof, preferably 1–5 webs, of crimped and carded staple on a supporting surface, such as one or more sequentially arranged continuous belt(s) or rolls, movably biased in machine direction;

(b) initially lightly bonding the formed and compiled web(s) to obtain a facing (i.e. a body contacting surface) component, using a low density bonding pattern, the bonding points within such low density pattern preferably not exceeding about 5% of the corresponding surface area of the facing component, and preferably about 0.5–5%, per unit length;

Depending upon desired softness and the bonding density of the body-contacting facing component, penetration of bonding points (i.e. lands height in calender bonding) into the compiled webs is not less than about 30%, can usefully extend from about 50%–100% and preferably does not exceed about 80% penetration, based on the thickness of the corresponding unbonded compiled web(s);

Formation of the corresponding base component (i.e. outside noncontacting surface of the nonwoven material) is then obtained by (c) laying at least one web comprising staple fiber and/or fibrillated film, preferably as air-laid short, spun staple fiber or filament, such as crimped or uncrimped polyolefin staple preferably although not exclusively up to about 0.75" in length, onto the inside face of the lightly bonded facing component, under lay down conditions favoring arrangement of the staple fiber and/or fibrillated film in general cross- or transverse-direction relative to machine direction of the facing component; and (d) through bonding the web(s) of transversely laid staple fiber or filament and/or fibrillated film to form a base component having a substantially greater bonding density than the facing component, (i.e. usefully defined as about 10%–20% and preferably 10%–15%) based on the total surface area of the base component per unit length, to obtain the desired nonwoven material.

The term "general transverse-direction" for present purposes is defined as an arrangement of at least a majority of air-laid fiber or filaments, laid down by means hereafter described at an angle of more than about 45° and less than about 135° relative to machine direction of the facing component.

The term "substantially greater bonding density" as applied to the base component, in comparison with the facing component, relates to relative number of bonding areas within a general ratio of about 1 (facing) to 3–10 (base) and preferably about 1 to 3–5. Such areas can optionally vary in depth of penetration.

High loft nonwovens within the scope of the present invention, particularly material retaining desired softness, durability and water flow-through characteristics comprise, in combination (A) a facing component defining a water permeable body-contacting surface comprising at least one lightly bonded web of staple thermoplastic fiber or filament; and preferably about 1–5 webs;

(B) a base component defining an external surface of the nonwoven and comprised of at least one web of short thermoplastic staple fiber or filament favoring arrangement in general cross- or transverse direction relative to the machine direction of the bonded facing component and having a substantially greater bonding density than the facing component; and (C) an optional gate layer comprising up to about 2 perforated (perforations or interspaces preferably totaling about 10% to about 90% of total area) and/or fibrillated films arranged intermediate the facing component and the base component, and through bonded to the facing and/or base component(s).

Figure 1:
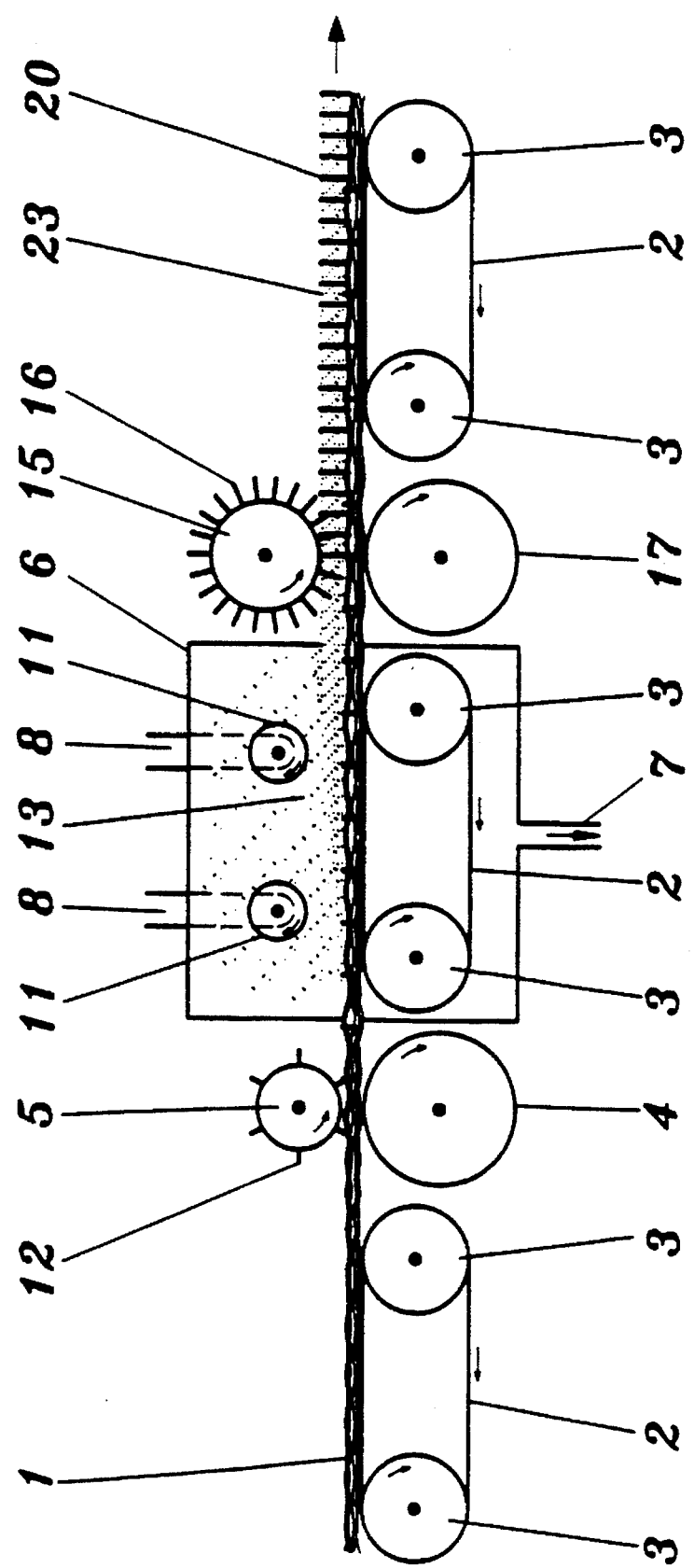
FIGS. 1, 4 and 6 depict processing lines capable of producing the non-wovens of the instant invention.

FIG. 1 schematically represents part of a production line capable of producing nonwoven material having high loft and durability characteristics in which a plurality of compiled crimped and carded staple fiber-containing webs (1) such as spinnable mono- and/or bicomponent thermoplastics, inclusive of polypropylene and/or polyethylene and preferably having a 1"–3" staple length and a denier of about 1–15 dpf, are produced conventionally and arranged in general machine direction onto a continuous belt (2) mounted on rollers (3) rotatably activated by means not shown; the compiled webs are then passed through a first calender consisting of a plain anvil roller (4) and a heated patterned mandrel (5), whose lands or bonding points (12) are schematically represented as peripherally located and relatively widely-spaced teeth, the resulting bonding points being correspondingly shown as homogeneous in length and structure, and of sufficient depth to produce bonding loci or patterns (20) shown in some figures as rectangular shaded areas, extending to a depth of from about 30%–100% of the thickness of the unbonded compiled facing webs (1). The resulting lightly-bonded facing component is then passed through a conventional fiber air-laying device comprising a suction box (6) with a bottom vacuum outlet (7) having sufficient capacity to balance, volume-wise, against air and staple fiber supplied through feeder lines (8) feedably connected to two circumferentially slotted and rotatably-mounted cylindrical-shaped forming heads (11) (shown endwise) possessing axially oriented slots (not shown) of sufficient width and length to permit deposit of a base layer (23) of short (preferably, although not exclusively, about 0.75" in length) uncrimped staple fiber (13) of homogeneous or mixed denier onto moving bonded facing (1), the forming heads and slots being preferably positioned to favor fiber deposit in a general cross direction transverse to the machine direction of belt (2) and bonded facing component (1), the mounting means and rotating means for forming heads (11) are not shown. The coated facing is then passed by belt (2) to a second calender shown as a plain anvil roll (17) and a heated patterned roll (15) equipped with a plurality of lands again represented as teeth (16) of sufficient depth and number to bond fibers (13) to facing component (1) (Ref., FIG. 2) and to provide a base surface (23) capable of direct or indirect fluid-feedable contact with a conventional fluid-retaining core or liquid-holding component (not shown) in a final product.

As above noted, bonding patterns (20) in the facing component and the base component are represented schematically as discrete lines or as shaded rectangular areas (See FIG. 2) rather than factually as a patterned collection of bond points or beads, and the length or depth of penetration of such bonding patterns into facing component (1) is optionally shown as less than 100% penetration while the corresponding base component (23) side, formed of bonded transversely-laid fiber (13), is shown as fully penetrated (i.e. 100%) and would normally extend at least down to the interface with facing component (1). The depth of penetration, in each case, depends substantially upon the desired amount of loft and durability of the resulting nonwoven.

Figure 2:
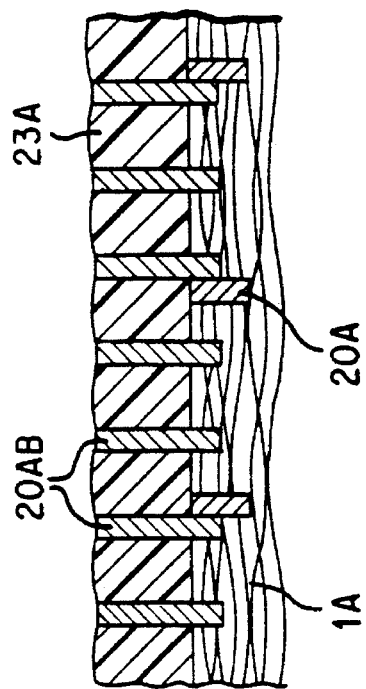

FIG. 2 represents a schematic break away cross section of a nonwoven of a type obtainable in accordance with the device and steps outlined in FIG. 1, in which bonded facing component (1A), which would be the body-contacting side of a nonwoven coversheet, for instance, is lightly bonded (20A) compared with the occurrence of bonding points (20AB) in base component (23A). As shown, the bonded areas (20AB) and (20A) of the two components can conveniently overlap through, a common internal area within the nonwoven.

Figure 3:
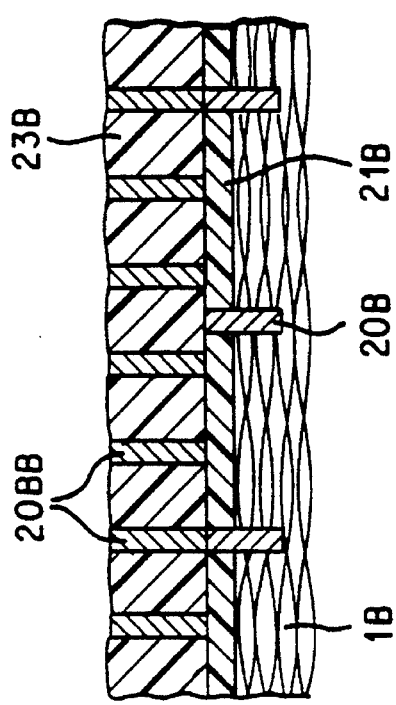

FIG. 3 represents, in schematic cross section, a modification of the nonwoven material of FIG. 2, in which one or more layer of a fibrillated film, and/or perforated film (21B) (perforations and fibrils not shown) are initially compiled onto carded fiber web(s) of the facing component (1B) and initially through bonded (20B) to form an intermediate zone to which the base component (23B) can be easily bonded (20BB).

Figure 4:
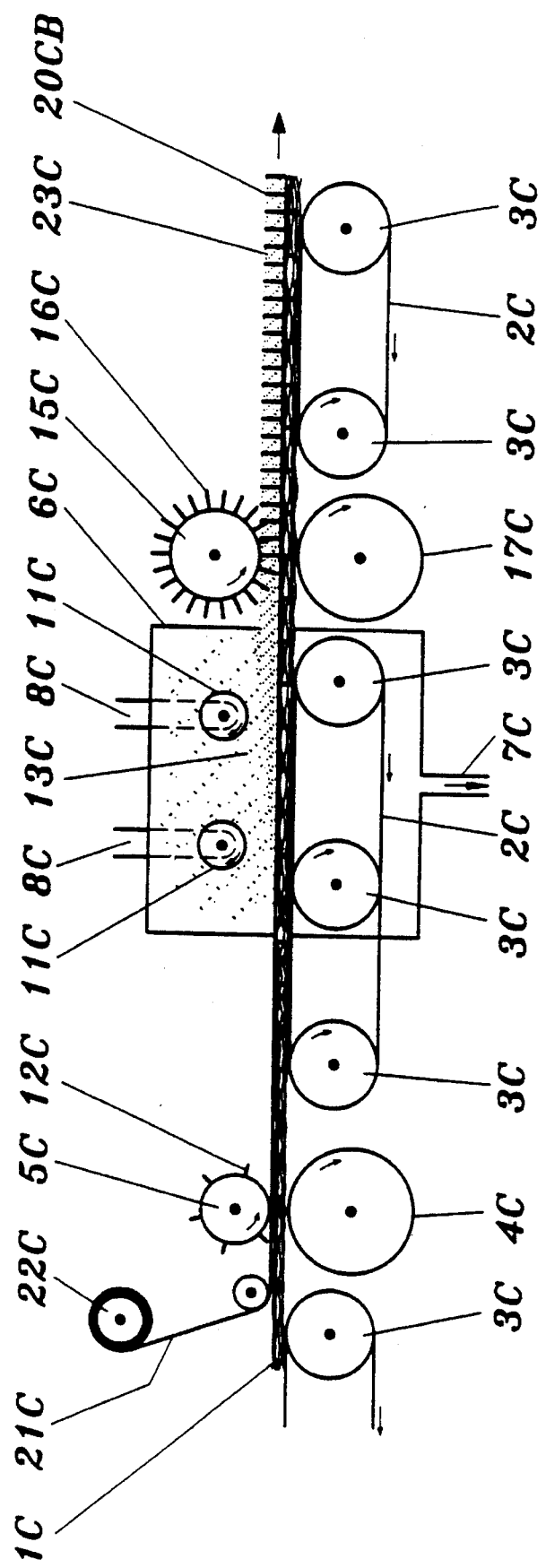

A modification of the partial production line of FIG. 1 which is suitable for producing the type material represented in FIG. 3, is shown schematically in FIG. 4, in which the same or similar components share common arabic numerals as in the preceding Figures, the perforated or fibrillated film (21C) being conveniently applied from feed roll (22C) or processed in situ, i.e. conventionally fibrillated (not shown), at some point between roll (22C) and the first bonding operation.

The film (21C) and unbonded compiled facing web(s) (1C) are initially through bonded as a unit, using anvil roll 4C and heated mandrel (5C). The remaining process steps and components are essentially as described with respect to FIG. 1.

Figure 5:
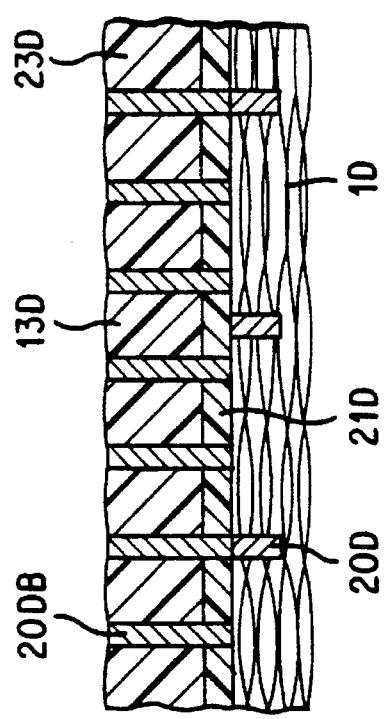
FIGS. 2, 3 and 5 are cross-sectional schematics of nonwovens producible by the instant invention.
Figure 6:
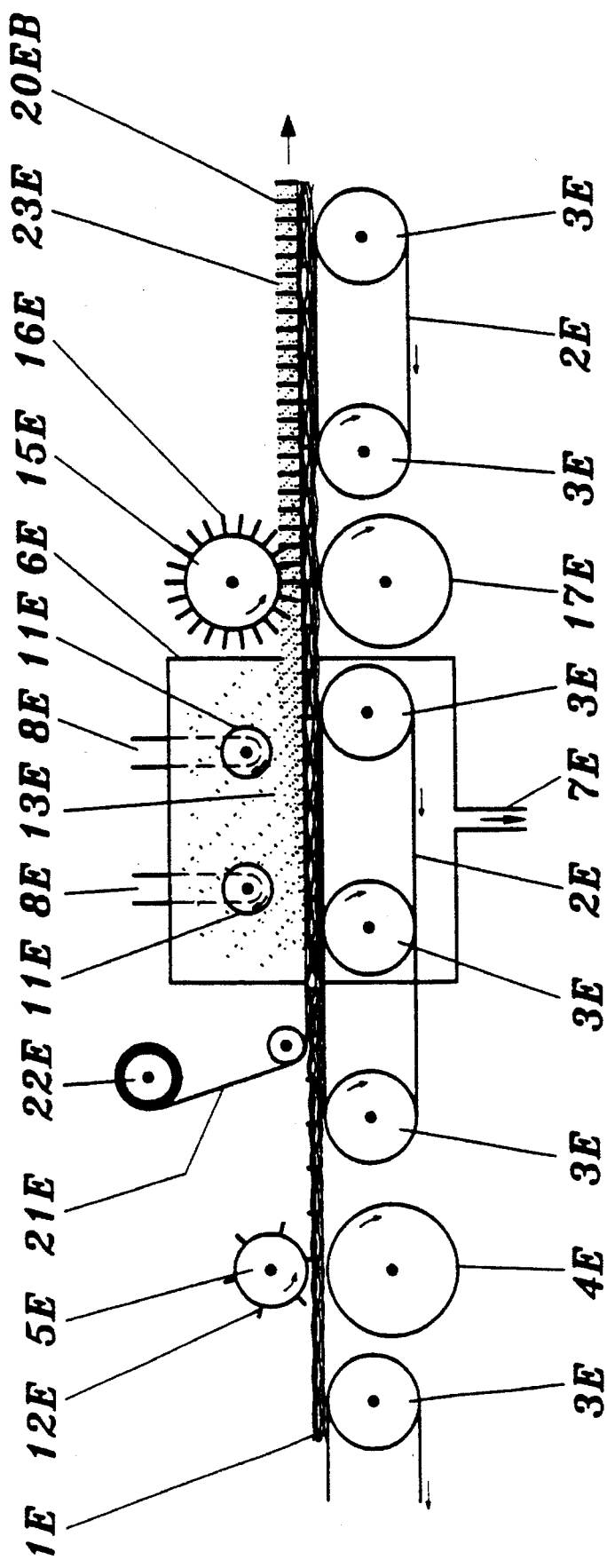

FIG. 5 schematically demonstrates a cross section of a further modification of the nonwoven materials of FIGS. 2 and 3, in which perforated or fibrillated film (21D) and transversely oriented staple fiber (13D) forming a base layer (23D) are applied onto a prebonded (20D) facing component (1D) and, thereafter, bonded (20DB) through fibrillated- or perforated-film (21D) in the manner proposed in FIG. 6. As before, identical arabic numbers represent the same or similar components and parts.

FIG. 6 schematically represents a process or technique whereby one or more, preferably up to two layers (1–2) of fibrillated and/or perforated film (21E) are applied from feed roll (22E) onto a prebonded facing component (1E) prior to passage through suction box 6E, the remaining steps and components being similar to those described in FIG. 1.

In FIGS. 3, 4, 5 and 6 the interface or gate layer identified as 22B, 22C, 22D and 22E represent one or several films which, optionally, can possess (a) a higher (b) a lower, or (c) the same softening and melting points as corresponding monocomponent staple fiber or the sheath layer of bicomponent fiber utilized in webs forming the facing and/or base components.

For present purposes the melting or softening point of the thermoplastic fibrillated or perforated film of the interface layer such as polyolefin or other thermoplastic film, can optionally possess at least a 5° C. and preferably a 5° C.–20° C. higher melting or softening point than the adjacent staple fiber or filament of the facing and/or base component(s). Such films can be arranged in a machine oriented direction, in cross direction, or a mixture thereof, the shape and amount of perforation (area wise) and/or the dimensions of fibrils of a fibrillated film being varied, as desired, to permit an adequate fluid acquisition rate together with an acceptable resistance to rewet, while providing a suitable interface to integrate the base and/or facing components of the nonwoven product and supply needed durability.

Bonding techniques known and practiced in the art, inclusive of spray or roll-applied binder material, heated calender roll(s), directed hot air, sonic and laser bonding techniques can be used singly or in combination in accordance with the present concept, provided the above-described, bonding steps and parameters are followed, and the facing and base components are laid down in the order described.

Fiber or filament used to form webs of the facing component is preferably spun from polyolefins such as isotactic polypropylene alone or combined with similar hydrophobic polyolefins and/or nonwoven copolymers thereof, the degraded spin melt conveniently having a weight average varying from about $3 \times 10^5$ to about $5 \times 10^5$, a molecular weight distribution of about 5.0–8.0, a melt flow rate of about 2.5 to about 4.0 g/10 min., plus a spin temperature within a range of about 220° C.–300° C.

Also includible within the spun melt used to form staple fiber for webs are various art-recognized fiber additives including lubricants, and antistatic agents, pH stabilizers such as calcium stearate, antioxidants, pigments, including whiteners and colorants such as $TiO_2$ and the like. Generally such additives can vary, in amount, from about 0.5%–3% by weight of spun melt or fiber.

Spun fiber or filament used to form webs used in the present invention preferably comprise spun melt staple fiber, filaments or fibrillated film of bicomponent or monofilament types which are topically or otherwise treated with surfactants and/or lubricants prior to cutting and carding steps.

In general, webs used to form nonwovens within the scope of the present invention can be formed by a conventional "Dry" Carded Process using staple fiber bonded together using conventional techniques such as adhesive binders (U.S. Pat. No. 4,535,013), calender rolls, hot air, sonic, laser, pressure bonding, needle punching and the like, known to the art.

As above noted, webs used to fabricate nonwoven material of the present invention can usefully comprise conventional crimped monocomponent as well as concentric or non-concentric sheath/core or side-by-side-type bicomponent fiber. Suitable sheath/core fibers may include polyethylene/polypropylene, polyethylene/polyester, and polypropylene/polyester, as well as copolyester/polyester combinations, preferably within a range of about 1–3/3–6 denier.

Also within the scope of the present invention are nonwovens comprised of one or more bonded webs of modifier-treated polyolefin fiber- and/or fiber-like (fibrillated film) components having a mixed fiber denier of homogeneous and/or bicomponent types not exceeding about 40 dpf. Such webs as above noted preferably utilize fiber or filaments within a range of about 1–5 dpf.

In addition, the resulting nonwoven material can be embossed and/or calender printed conventionally with various designs and colors, as desired, to increase loft, augment wet strength, and provide easy market identification.

In addition, webs used in forming nonwovens within the scope of the present invention are produced from one or more types of conventionally spun fibers or filaments having, for instance, round, delta, trilobal, or diamond cross sectional configurations.

Nonwoven cover stock of the above-defined types can usefully vary in weight from about 10–45 gm yd$^2$ or higher.

I claim:

1. A high loft nonwoven material comprising, in combination:

(A) a facing component defining a water-permeable body-contacting surface comprised of at least one lightly bonded web of staple thermoplastic fiber or filament;

(B) a base component defining an external surface of said nonwoven and comprised of at least one web of short thermoplastic staple fiber or filament favoring arrangement in general cross- or transverse-direction relative to the machine direction of said lightly bonded facing component; and (C) up to about 2 perforated and/or fibrillated films arranged intermediate said facing component and said base component, and through bonded to said facing component or to said based component;

wherein the base component is bonded to the facing component by bonding having a substantially greater bonding density than said lightly bonded facing component effected through the base component and into the facing component.

2. A water-permeable, high loft nonwoven material comprising, in combination:
   (A) a facing component comprised of at least one lightly bonded web of staple thermoplastic fiber or filament disposed in a first general direction;
   (B) a base component comprised of at least one web of thermoplastic staple fiber or filament disposed in a general cross-direction relative to the direction of said lightly bonded facing component and which is bonded to the facing component by bonding effected through the base component in a bonding pattern having a substantially greater bonding density than the density of the bonding of the lightly bonded facing component.

3. The nonwoven material of claim 2 wherein the lightly bonded facing component has a bonding pattern not exceeding about 5% of the surface area of the facing component internal to said nonwoven material and said pattern has a penetration of not less than about 30% of the thickness of the unbonded compiled web(s) forming said facing component.

4. The nonwoven material of claim 3 wherein the base component comprises air laid short uncrimped staple fiber having a bonding pattern density of about 10%–20% relative to the corresponding surface area of the base component.

5. The nonwoven material of claim 3 a facing component of about 1–5 webs comprising crimped and carded polyolefin staple fiber or filament.

6. The nonwoven material of claim 2 wherein the component is directly bonded to said facing component.

7. The nonwoven material of claim 6 having a facing component of about 1–5 webs comprising crimped and carded polyolefin staple fiber or filament.

8. The nonwoven material of claim 2 further comprising a gate layer between the facing and base components comprising up to two layers of perforated or fibrillated film which is through bonded to the facing component.

9. The nonwoven material of claim 8 having a facing component of about 1–5 webs comprising crimped and carded polyolefin staple fiber or filament.

10. The nonwoven material of claim 8 wherein perforated or fibrillated film is through bonded to said base component.

11. The nonwoven material of claim 10 having a facing component of about 1–5 webs comprising crimped and carded polyolefin staple fiber or filament.

12. The nonwoven material of claim 2 having a facing component of about 1–5 webs comprising crimped and carded polyolefin staple fiber or filament.

13. The nonwoven material of claim 2 wherein the staple fiber comprises bicomponent fiber.

14. A disposable diaper comprising, in combination, a fluid-impervious barrier sheet, a fluid absorbing core component, and a facing of coverstock material wherein said coverstock material is a high loft nonwoven as claimed in claim 2.

15. The nonwoven material of claim 2 wherein the bonding of the facing component and the bonding of the base component to the facing component is selected from the group consisting of bonding by calendering with a heated roll, bonding by heating with directed hot air, sonic bonding, and laser bonding.

16. The nonwoven material of claim 2 wherein the facing component comprises polypropylene fibers or filaments.

17. A body contacting article comprising a fluid absorbent core and the high loft nonwoven material of claim 2 wherein the water-permeable facing component defines a body contacting surface and the base component defines an absorbent core facing component.

18. The body contacting article of claim 2 which is a diaper and further comprises a fluid imperveious backing sheet.

19. The body contacting article of claim 17 wherein the nonwoven material has a weight of from 10–45 grams/yard$^2$.

20. The nonwoven material of claim 2 having a weight of from 10–45 grams/yard$^2$.

21. The nonwoven material as claimed in claim 2, which is produced by the method comprising:
   (a) forming and compiling at least one nonwoven web of staple fibers or filaments of thermoplastic material on a supporting surface movably biased in machine direction;
   (b) lightly bonding said at least one formed and compiled web to obtain a facing component with a low area density bonding pattern on a face thereof;
   (c) forming at least one nonwoven web comprising staple fibers or filaments on the face of said facing component to form a base component having said fibers or filaments oriented in a general cross direction relative to the machine direction of said facing component; and
   (d) bonding through said base component with bonds that penetrate through the base component to at least the face of the facing component, said bonds forming a substantially greater area density bonding pattern than the low area density bonding pattern on the face of said facing component, to obtain the high loft nonwoven material.

22. The nonwoven material as claimed in claim 21 wherein the (b) bonding step imparts a low area density bonding pattern not exceeding about 5% of the surface area of the face of the facing component.

23. The nonwoven material of claim 22 wherein the at least one formed and compiled web comprises crimped and carded polyolefin staple fibers or filaments.

24. The nonwoven material of claim 23 wherein staple fibers or filaments of the facing component comprise bicomponent fibers wherein at least one of the components is selected from the group consisting of polypropylene and polyethylene.

25. The nonwoven material of claim 22 wherein the base component comprises air laid short uncrimped staple fibers and the (d) bonding step comprises bonding the base component with an area density bonding pattern of about 10–20% of the surface area of the base component.

26. The nonwoven material of claim 22 wherein the facing component is bonded through to a depth of about 30% to 100% of the thickness of the facing component.

27. The nonwoven material of claim 26 wherein the staple fibers or filaments of the facing component and the base component comprise crimped polyolefin fibers or filaments.

28. The nonwoven material of claim 27 wherein the polyolefin fibers or filaments comprise polypropylene.

29. The nonwoven material of claim 28 wherein said base component comprises air laid short uncrimped staple fibers and the base component is bonded with an area density bonding pattern of about 10–20% of the surface area of the base component.

30. The nonwoven material of claim 29 further comprising the step of applying a gate layer of up to two layers of perforated film or fibrillated film onto the at least one formed and compiled web and bonding through the gate layer and into the at least one formed and compiled web during the (b) bonding step to form the facing component wherein the gate layer forms the face of the facing component.

31. The nonwoven material of claim 29 further comprising the step of applying a gate layer of up to two layers of perforated film or fibrillated film onto the inside face of the facing component and during the (d) bonding step bonding through the base component and the gate layer to the face of the facing component to obtain the high loft nonwoven material.

32. The nonwoven material of claim 21 wherein the (b) bonding step imparts a bonding pattern whose penetration into the at least one formed and compiled web is not less than about 30% of the thickness of the at least one formed and compiled web.

33. The nonwoven material of claim 32 wherein the at least one formed and compiled web comprises crimped and carded polyolefin staple fibers or filaments.

34. The nonwoven material of claim 21 further comprising the step of applying perforated and/or fibrillated film onto the at least one formed and compiled web and bonding through the film and into the at least one formed and compiled web during the (b) bonding step to form said facing component wherein the film forms the face of said facing component.

35. The nonwoven material of claim 34 wherein the perforated and/or fibrillated film has a higher melting and softening point than staple fibers or filaments of the facing component.

36. The nonwoven material of claim 21 wherein said at least one formed and compiled web comprises crimped and carded polyolefin staple fibers or filaments.

37. The nonwoven material of claim 36 wherein the staple fibers or filaments of the base component comprise bicomponent fibers wherein at least one of the components is selected from the group consisting of polypropylene and polyethylene.

38. The nonwoven material of claim 21 wherein the (b) and (d) bonding steps comprise bonding with a heated calender roll.

39. The nonwoven material of claim 21 wherein the (b) bonding step imparts a bonding pattern in the facing component whose penetration into the facing component does not exceed more than about 80% of the thickness of the facing component.

40. The nonwoven material of claim 21 further comprising the step of applying a gate layer of up to two layers of perforated film or fibrillated film onto the face of the facing component and during the (d) bonding step bonding through the base component and the gate layer to the face of the facing component to obtain the high loft nonwoven material.

41. The nonwoven material of claim 40 wherein the gate layer is a fibrillated film.

42. The nonwoven material of claim 21 wherein the base component comprises polypropylene fibers or filaments.

43. The nonwoven material of claim 21 having a weight of from 10–45 grams/yard$^2$.

* * * * *

UNITED STATES PATENT AND TRADEMARK OFFICE
CERTIFICATE OF CORRECTION

PATENT NO. : 5,470,640
DATED : November 28, 1995
INVENTOR(S) : James P. Modrak

It is certified that error appears in the above-indentified patent and that said Letters Patent is hereby corrected as shown below:

Claim 5, column 7, line 24, of the patent after "claim 3" insert --having--.

Signed and Sealed this

First Day of April, 1997

Attest:

BRUCE LEHMAN

Attesting Officer

Commissioner of Patents and Trademarks